United States Patent
Smith (10) Patent No.: US 8,096,102 B2
(45) Date of Patent: Jan. 17, 2012

(54) OFFSET PICKUP TINES TO IMPROVE FEEDING PICK UP

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 26 days.

(21) Appl. No.: 12/580,350

(22) Filed: Oct. 16, 2009

(65) Prior Publication Data

US 2011/0088365 A1 Apr. 21, 2011

(51) Int. Cl.
*A01D 43/02* (2006.01)
*A01D 89/00* (2006.01)
(52) U.S. Cl. .......................................... 56/364
(58) Field of Classification Search ............... 56/364, 56/341, 400, 16.1
See application file for complete search history.

(56) References Cited

U.S. PATENT DOCUMENTS

| | | | |
|---|---|---|---|
| 2,527,887 A * | 10/1950 | Martin ............................ | 56/364 |
| 3,151,435 A | 10/1964 | Jonston | |
| 3,478,500 A * | 11/1969 | Rhoads ...................... | 56/16.4 R |
| 3,512,345 A * | 5/1970 | Smith ............................ | 56/16.9 |
| 3,545,187 A * | 12/1970 | Whitney ...................... | 56/16.7 |
| 3,678,671 A * | 7/1972 | Scarnato et al. ................ | 56/505 |
| 4,161,859 A | 7/1979 | Storm et al. | |
| 4,297,833 A | 11/1981 | Gaeddert | |
| 4,928,462 A | 5/1990 | Lippens et al. | |
| 4,929,904 A * | 5/1990 | Bohman et al. ................ | 324/696 |
| 5,394,682 A * | 3/1995 | Frimml et al. .................. | 56/341 |
| 5,408,813 A * | 4/1995 | Haban et al. ................... | 56/14.8 |
| 5,524,425 A * | 6/1996 | Gallazzini ....................... | 56/364 |
| 5,595,055 A | 1/1997 | Horchler, Jr. et al. | |
| 5,848,523 A * | 12/1998 | Engel et al. ..................... | 56/341 |
| 6,170,244 B1 | 1/2001 | Coers et al. | |
| 6,237,695 B1 * | 5/2001 | Pierce et al. .................... | 172/79 |
| 6,279,304 B1 * | 8/2001 | Anstey et al. .................. | 56/341 |
| 6,295,797 B1 | 10/2001 | Naaktgeboren et al. | |
| 6,314,709 B1 | 11/2001 | McClure et al. | |
| 6,327,840 B1 | 12/2001 | Rumph | |
| 6,644,006 B1 | 11/2003 | Merritt et al. | |
| 6,688,092 B2 | 2/2004 | Anstey et al. | |
| 6,843,045 B2 | 1/2005 | Bickel | |
| 6,877,304 B1 | 4/2005 | Smith et al. | |
| 6,948,300 B1 * | 9/2005 | Bandstra et al. ................ | 56/341 |
| 7,204,074 B2 * | 4/2007 | Bandstra et al. ................ | 56/341 |
| 7,370,462 B2 * | 5/2008 | Kraus et al. ..................... | 56/341 |
| 7,448,196 B2 * | 11/2008 | Schrag et al. ................... | 56/341 |
| 7,726,111 B2 * | 6/2010 | Grywacheski et al. .......... | 56/364 |
| 2005/0210855 A1 * | 9/2005 | Bandstra et al. ................ | 56/341 |
| 2006/0242937 A1 * | 11/2006 | Pourchet et al. ................ | 56/219 |
| 2006/0283163 A1 * | 12/2006 | Kraus et al. ..................... | 56/16.8 |

FOREIGN PATENT DOCUMENTS

| | | |
|---|---|---|
| DE | 3631777 A1 * | 4/1987 |
| EP | 803184 | 10/1997 |
| JP | 07087830 | 4/1995 |
| JP | 10304758 | 11/1998 |
| JP | 2003009647 | 1/2003 |
| SU | 1117007 | 10/1984 |

* cited by examiner

*Primary Examiner* — Arpad Fabian-Kovacs
(74) *Attorney, Agent, or Firm* — Patrick M. Sheldrake (57) ABSTRACT

An pickup comprising offset pickup tines for the feeding of balers or harvesters. The tines are mounted to a rotating tine bar and arranged such that a plurality of elongate tines are connected to the trailing edge of the tine bar at the end portions and a plurality of elongate spaced-apart rotor tines are connected to the leading edge of the tine bar at the central portion.

17 Claims, 8 Drawing Sheets

OFFSET PICKUP TINES TO IMPROVE FEEDING PICK UP

TECHNOLOGY FIELD

The present invention relates generally to pickups for crop and forage pick up and handling, and more particularly, to offset pickup tines for improved feeding of balers or harvesters.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, most likely a round baler, is pulled along the windrows to pick up the crop material and form it into cylindrically-shaped round bales. More specifically, the pickups of the baler gather the cut and windrowed crop material from the ground then convey the cut crop material into a bale-forming chamber within the baler. The pickup assembly has a drive mechanism that operates to activate both the pickups, augers, and a rotor, and the pickup drive mechanism may be operably connected to and driven by the main drive mechanism of the baler. A conventional baling chamber may consist of a pair of opposing sidewalls with a series of belts that rotate and compress the crop material into a cylindrical shape. When the bale has achieved a desired size and density, the operator may wrap the bale to ensure that the bale maintains its shape and density. The operator ejects the bale from the baler and onto the ground by, for example, raising the tailgate of the baler. The tailgate is then dosed and the cycle repeated as necessary and desired to manage the field of cut crop material.

The rotor conveyor mechanism ("rotor" or "rotor mechanism") between the pickup and the bale-forming chamber is, itself, known in the prior art, as shown, for example, in U.S. Pat. Nos. 5,595,055 and 6,644,006. The rotor mechanism may comprise a stuffer or a rotor feeding mechanism that stuffs the crop material into the gap between the floor roll and the starter roll into the bale-forming chamber. A rotor and stuffer differ in the method of pushing the material—rotors use strictly a rotational motion while stuffers convert a rotating drive into linear crop motion.

In most conventional round balers with wide pickups, for example, augers are used to transfer crop from the outside portions of the pickups inward toward the bale chamber. Conventionally, all of the pick up tines are mounted in the round baler on the trailing side of the tine bar. For balers with a rotor feeding system, the augers need to be positioned some distance in from the front of the rotor in order for crop to be transferred from the augers to the rotor. The configuration results in an undesirable space or "dead area" where crop can lie without being contacted by either the pickup tines or the rotor (see e.g., FIG. 1). As a result, this area can fill up with crop material and cause plugs in the pickup and/or rotor. This may be especially problematic for light crop.

Figure 2:
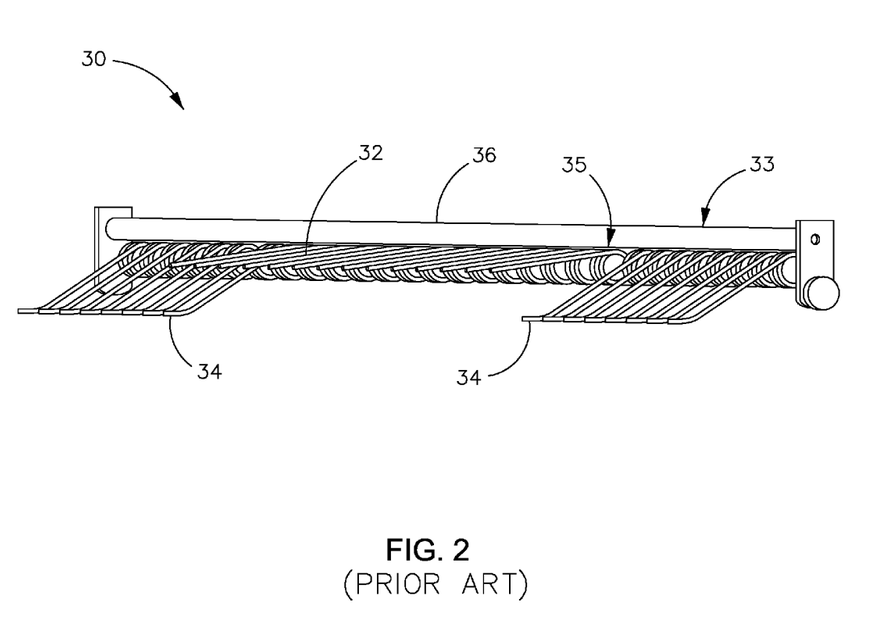
FIG. 2 shows details of the tine mounting in the conventional manner for the round baler of FIG. 1.

One way currently employed to reduce this "dead area" is to angle the tines in front of the rotor rearward so that they come closer to the rotor (see e.g., FIG. 2 showing the rotor tines having a straighter configuration as compared to the auger tines which are angled forward in the direction of travel). While this does reduce the "dead area" slightly, it is not sufficient to eliminate the problem. Also, modification of the rotor tines requires two different tine designs, resulting in manufacturing, inventory and maintenance issues.

What is needed is a solution that further reduces and/or substantially eliminates the "dead area" between the pickup and the rotor and that provides efficiencies in manufacturing, inventory and maintenance of the pickup equipment.

SUMMARY

Embodiments of the present invention address and overcome one or more of the above shortcomings and drawbacks, by providing offset mounted pickup tines that reduce and/or substantially eliminate the dead area between the pickup tines and the rotor. This reduced dead area when the pickup is in the transfer position provides improved control of the crop as it is transferred from the pickup to a downstream member of the machinery feeder assembly. Embodiments of the offset pickup tines may be used for crop or forage pickup machinery.

Embodiments of the present invention are directed to a pickup including a rotating tine bar having a longitudinal length and axis of rotation, a central portion, two end portions, a leading edge, and a trailing edge. The pickup includes a plurality of elongate spaced-apart auger tines connected to the trailing edge of the tine bar at the end portions. The pickup also includes a plurality of elongate spaced-apart rotor tines connected to the leading edge of the tine bar at the central portion. The auger tines and the rotor tines include a coil section and an extended portion extending outward from the tine bars.

According to one aspect of the invention, the leading edge and the trailing edge of the tine bar are about 180 degrees apart and on opposite sides of the tine bar. The rotor tines lead the auger tines as the tine bar rotates about its axis of rotation.

According to another aspect of the invention, the extended portions of the plurality of rotor tines extend in-line along a line parallel and offset from the longitudinal axis of rotation of the tine bar and substantially parallel to one another. The extended portions of the plurality of auger tines may also extend in-line along a line parallel and offset from the longitudinal axis of rotation of the tine bar and substantially parallel to one another.

According to another aspect of the invention, each coil section of the rotor tines and the auger tines further includes: a leading edge of the coil section, and a trailing edge of the coil section. The leading edge of the coil section of each auger tine is connected to the trailing edge of the tine bar, and the trailing edge of the coil section of each rotor tine is connected to the leading edge of the tine bar.

According to another aspect of the invention, the rotor tines and the auger tines are substantially the same structure. According to another aspect of the invention, the rotor tines and the auger tines are substantially the same shape and size. According to another aspect of the invention, the rotor tines and the auger tines comprise forward curved tines, wherein the rotor tines lead the auger tines in a direction of the tine bar travel.

According to another aspect of the invention, the pickup is attached to a piece of crop or forage pickup machinery.

According to other embodiments of the invention, an improved pickup mechanism is provided having offset mounted pickup tines for improved pick up of, for example, a crop. The pick-up mechanism includes a plurality of tine bars extending transversely across a pickup assembly housing. Each tine bar includes a longitudinal length and axis of rotation, a central portion, two end portions, a leading edge, and a trailing edge. The pick-up mechanism also includes a plurality of elongate spaced-apart auger tines connected to a trailing edge of each of the pickup tine bars at the end portions, the auger tines extending outward from the tine bars. Further, the pick-up mechanism includes a plurality of elongate spaced-apart rotor tines connected to a leading edge of each of the pickup tine bars at the central portion, the rotor tines extending outward from the tine bars. A pickup drive shaft is operatively coupled to the pickup tine bars. For example, the pick up tine bars may be connected to the pick up drive shaft via a connecting support. The drive shaft and tine bars rotate as one. Cam followers at the end of each tine bar may engage a cam track mounted on the pick up frame and cause the tine bar to rotate in bearings mounted on the connecting support. When driven by the pickup drive shaft, the tine bars rotate about the pickup drive shaft and the tine bars rotate or pivot about the tine bar axis of rotation. The mounting of the auger tines to the trailing edge of the tine bar and the mounting of the rotor tines to the leading edge of the tine bar comprises an offset mounting of the pickup tines on each tine bar. The offset mounting of the pickup tines allowing the pickup rotor tines in the center portion to move a crop closer to a rotor as the pickup hands off the crop to the rotor while the pickup auger tines still have clearance with augers at the ends of the pickup.

According to another aspect of the invention, the offset mounting of the pickup tines brings the pickup rotor tines in close proximity to a rotor downstream of the pickup in the crop flow to reduce a dead area between the pickup and the rotor.

According to another aspect of the invention, the pickup tines include a coil section having a plurality of coils and an extended section extending from the coil section. A first coil of each coil section may be connected to the tine bar using a fastener. The other coils of the coil section are free to move allowing the tine to rotate or deflect about an axis of rotation through a center of the coil section and deflect backwards in a direction of travel of the tine.

According to another aspect of the invention, the rotor tines of each tine bar lead the auger tines of the same tine bar as the tine bar rotates about the pickup drive shaft due to the mounting position of the rotor tines on the leading edge of the tine bar and the auger tines on the trailing edge of the tine bar.

According to another aspect of the invention, the pickup mechanism further includes a pickup position and a transfer position. In the transfer position: the pickup auger tines are in close proximity to augers positioned downstream of the pickup mechanism in a feeder assembly, and the pickup rotor tines are in close proximity to tines of the rotor positioned downstream of the pickup mechanism in the feeder assembly. The positioning of the pickup rotor tines on the leading edge of the tine bar reduces any dead area between the pickup rotor tines and tines of the rotor.

According to still other embodiments of the invention, an improved pickup mechanism is provided for use, for example, with a feeder assembly of a baler or crop harvester. The pick-up mechanism includes a pickup weld assembly or housing having a feed opening. A plurality of tine bars extend transversely across the pickup weld assembly. Each tine bar comprises a longitudinal length and axis of rotation, a central portion, two end portions, a leading edge, and a trailing edge. An off-set mounting of the pickup tines to the tine bar is provided. The offset mounting comprising: a plurality of elongate spaced-apart auger tines connected to a trailing edge of each of the pickup tine bars at the end portions, the auger tines extending outward from the tine bars; and a plurality of elongate spaced-apart rotor tines connected to a leading edge of each of the pickup tine bars at the central portion, the rotor tines extending outward from the tine bars. A rotor may be positioned downstream to the pickup tine bars, the rotor being spaced apart from said pickup tine bar and defining a space therebetween. A pickup drive shaft may be operatively coupled to the pickup tine bars via, for example, a cam assembly. The tine bars may be driven by and rotate about the pickup drive shaft and the cam assembly may cause rotation of the tine bars about the tine bar axis of rotation. A transfer position exists wherein the pickup rotor tines of one of the tine bars are in close proximity to the rotor in the center of the pickup weld assembly and the pickup auger tines of the same tine bar are in close proximity to augers at the ends of the pickup weld assembly. The offset mounting of the pickup tines resulting in improved crop control as the crop is transferred from the pickup to the rotor due to a reduced dead area between the pickup and the rotor.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of a pickup and pickup mechanism having offset mounted pickup tines that reduce and/or substantially eliminate the dead area between the pickup tines and the rotor. The dead area being the space between the rotor tines and the rotor when the pickup is in the transfer position where the crop is not contacted or positively controlled by a member of feeder assembly of the machinery. The present invention is directed to embodiments of crop or forage pickup machinery having an improved pickup system comprising offset pickup tines. Embodiments of the present invention are particularly well suited, but in no way limited to, use with balers. The present invention may also find utility in use with round, square, or rectangular baler pickups and forage harvester pickups, for example.

Round balers are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosure of which is incorporated herein by reference in their entirety. Forage harvesters are also well known in the agricultural industry, and the instant invention can be used with substantially any of such machines. Reference is made, for example, to U.S. Pat. No. 6,314,709 that illustrate an exemplary harvester, the disclosure of which is incorporated herein by reference in its entirety.

Figure 3:
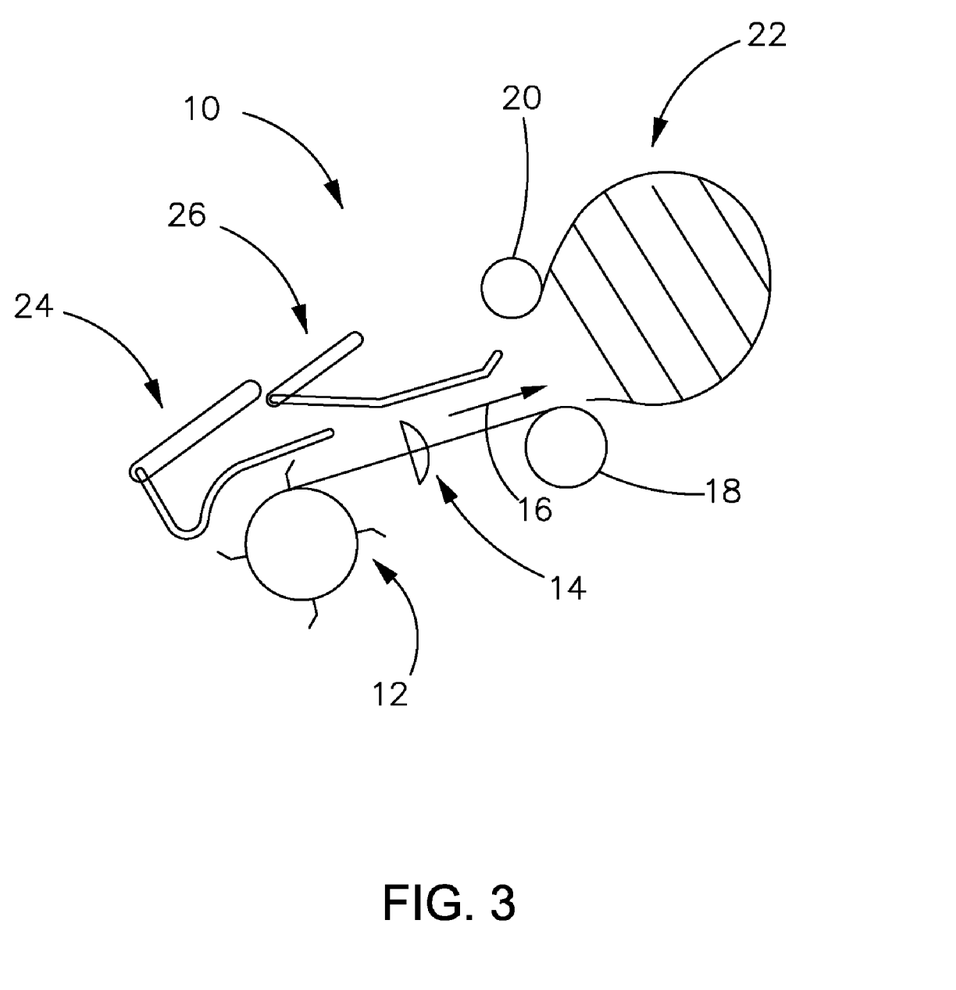
FIG. 3 shows a perspective view of an exemplary round baler in which the present invention may be employed.

FIG. 3A depicts an exemplary agricultural round baler, generally designated 10, as it would be pulled along a windrow of cut crop material by a tractor (not shown). As shown, baler 10 may comprise a wheel-supported bale-forming mechanism with a crop pickup 12 for moving the crop material from the field along and past the stuffer assembly 14 in the direction of arrow 16. The stuffer assembly pushes the crop material into the gap between the floor roll 18 and the starter roll 20 and thence into the bale-forming chamber 22. A pair of wind guards 24 and 26 may be provided to compact the crop prior to being fed into the bale-forming chamber. Pickup 12 is usually wider than the bale-forming chamber of the baler 10 and includes its own frame mounted to the main frame of the baler for pivoting about a horizontal transverse axis.

As alluded to previously, the crop in the field is usually arranged in a windrow as it is engaged by the pickup 12. Depending upon the condition of the crop, i.e., the volume and length of crop, the flow of the crop material through the pickup and stuffer can range from fairly constant to irregular, and may contain frequent or infrequent slugs—i.e., a larger than normal volume of material. The issue addressed herein relates to the understanding that the feeding of crop materials is improved if the space or dead area between the different pieces of the feeder mechanism can be minimized or substantially eliminated to more efficiently and effectively control and move crop through the pickup and into the baler.

Figure 1:
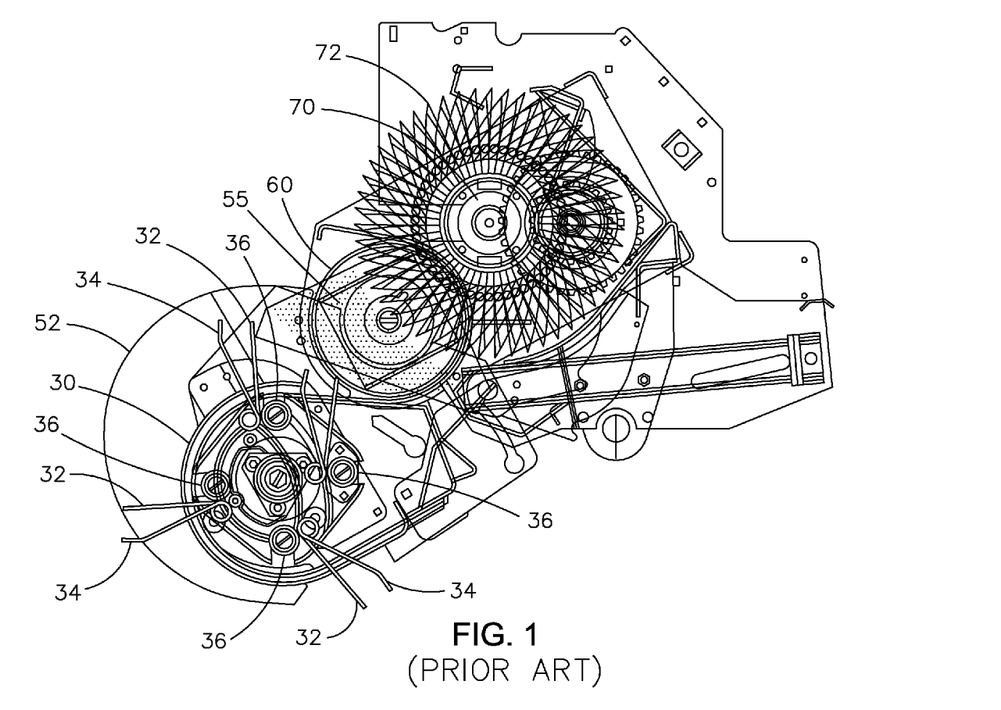
FIG. 1 is a cross-sectional view illustrating one conventional mounting of the pickup tines in a round baler.

Referring back to FIGS. 1 and 2, a conventional pickup and feeder are shown. As shown in FIGS. 1 and 2, the pickup tines are typically mounted on a tine bar extending across the pickup and are conventionally mounted on the same side and in the same orientation across the entire width of the pickup. An issue with this conventional arrangement is that, as mentioned above, the pickup is typically wider than the feeder. As a result, at each end of the pickup the tines feed into an auger and in the center of the pickup the tines feeds into a secondary feeding mechanism, which is normally a rotor or stuffer. As can be seen in the figures, the rotor is positioned further back from the pickup than the augers. As a result, the position that the pickup tines have to carry or push the crop is different for the ends of the pickup feeding the augers than it is for the center pickup tines feeding the rotor. That is, the center region through which the pickup tines have to push the crop into the rotor is further back than the ends where the augers are located. This results in a space or dead area between the pickup and the secondary feed mechanism (e.g., the rotor) where the crop material is not positively controlled.

What is needed then, is an improved pickup that accounts for this difference such that in the center of the pickup the pickup tines push the crop farther back towards the rotor versus at the end of the pickup feeding the augers. However, using conventional pickups and a conventional tine configuration—if the pickup tines are allowed to push the crop all the way back to the rotor, then the pickup tines at the ends of the pickup would interfere with the augers. This is unacceptable.

One conventional way of dealing with this situation is have two different pickup tines that are angled differently. As shown in FIG. 2, the mounting of the pickup tines on the tine bar may be the same—i.e., with all the tines mounted on the trailing edge of the tine bar—but the tines themselves may be angled differently to allow clearance for the auger and to allow the crop to be pushed back farther into the rotor in the center. As shown in FIG. 2, the center or rotor tines may be straight (or angled back as compared to the auger tines) and the tines at each end or auger tines may be angled tines. As shown, the auger tines are angled forward.

However, the configuration of FIG. 2 does not adequately account for the dead area between the rotor pickup tines and the rotor (or the tines of the rotor). What is desired for ideal crop feeding is for the rotor pickup tines to be right up against the rotor, i.e., in close proximity, so that there isn't any area that crop can fit without either the pickup rotor tines or the rotor tines contacting the crop. Stated another way, it is desirable to reduce and/or eliminate as much of the space or dead area between the pickup and the rotor as possible.

Figure 4:
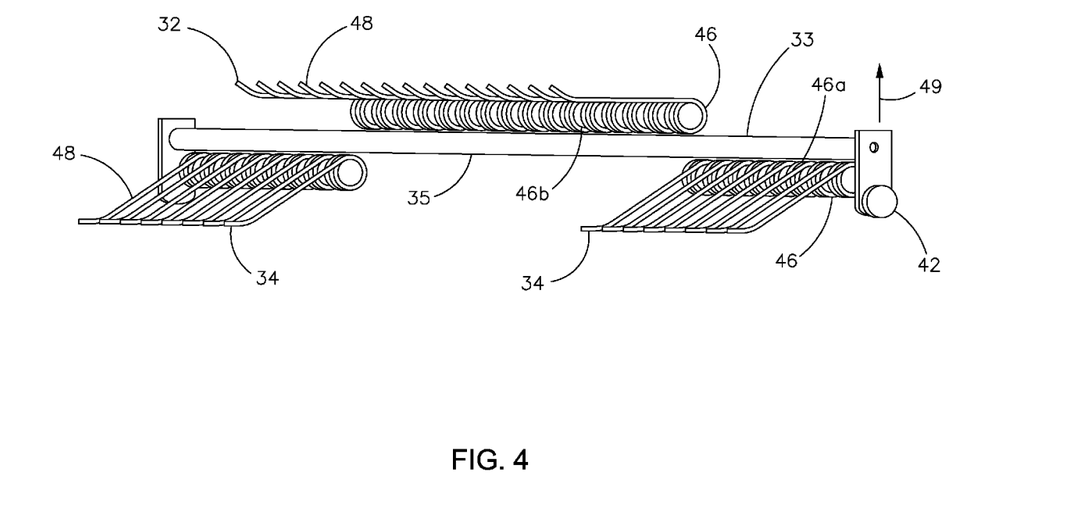
FIG. 4 is a cross-sectional view illustrating one embodiment of the present invention having offset mounting of the pickup tines.
Figure 5:
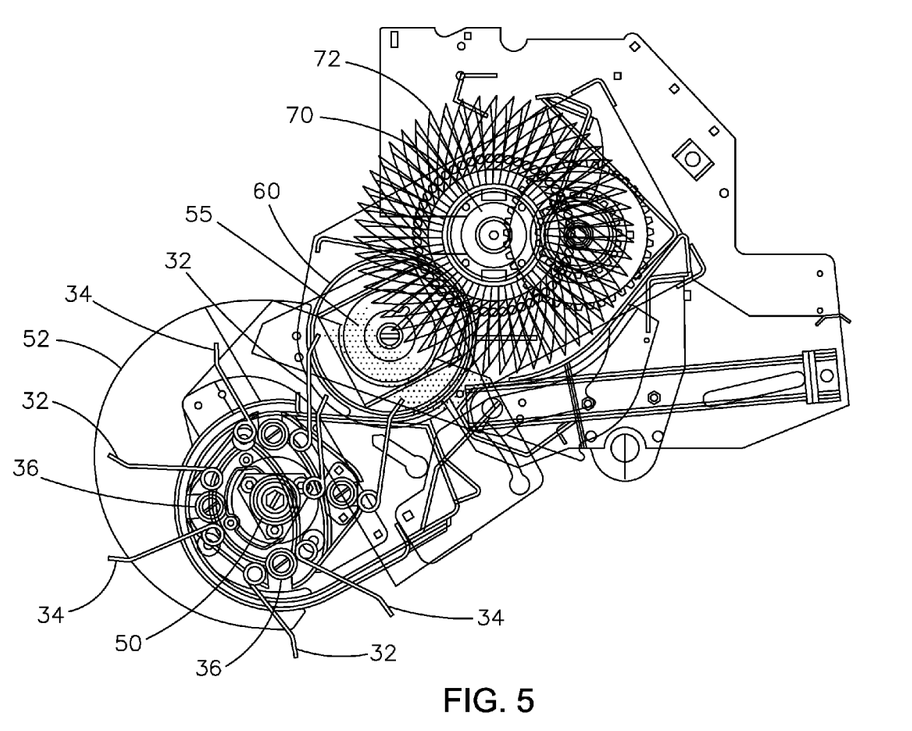
FIG. 5 shows additional details of the offset mounting of the pickup tines of FIG. 4.

Embodiments of the present invention solve this problem by off-setting the rotor tines 32 and the auger tines 34 on the pickup bar 36 of improved pickup 30 (see FIGS. 4 and 5). The rotor tines 34 are mounted to the leading edge 33 of the tine bar and the auger tines 34 are mounted to the trailing edge 35 of the tine bar 36. This allows the rotor tines 32, the pickup tines in the center 38 of the pickup 30, to move the crop closer to the rotor 70 while the auger tines 34 still have clearance with the augers 60 at the ends 40 of the pickup 30. An offset mounting scheme for the pickup tines 32, 34 reduces and/or substantially eliminates the space or dead area 55 between the pickup 30 and the rotor 70. The pickup tines 32, 34 are spaced-apart, preferably evenly across the length of the tine bar 36. As shown, the rotor tines 32 may be in line with one another, and the auger tines 34 may be in line with one another.

In is also preferred that all pickup tines 32, 34 are the same. For example, it is preferred to have one type of pickup tine for both the rotor tines 32 and the auger tines 34, each having the same structure (e.g., shape and size). Having common pickup tines for the pickup provides certain advantages and benefits relating to manufacturing, inventory, and maintenance of the pickup and the machinery in which the pickup is used. The pickup tines 32, 34 may differ in certain aspect, for example, in the structure for mounting the pickup tines 32, 34 to the tine bar 36.

Part of the improvement of the present invention is that identical or similar pickup tines 32, 34 may be used while still reducing and/or eliminating the dead area 55 between the pickup 30 and the rotor 70 by employing an offset mounting scheme for the pickup tines 32, 34 that allows the crop to be pushed farther back toward the rotor 70. So, at the end portions 40 of the pickup 30 (in front of the augers 60) the auger pickup tines 34 may be mounted on one side—i.e., the trailing edge 35—of the tine bar 36 and in the center portion 38 of the pickup 30 (in front of the rotor 70) the rotor pickup tines 32 may be mounted on the other side—i.e., the leading edge 33—of the tine bar 36. As a result of being mounted to the leading edge 33 of the tine bar 36, the rotor pickup tines 32 become closer to the rotor 70 (e.g., the rotor teeth or tines 72), thus reducing and/or substantially eliminating the dead area 55 between the pickup 30 and the rotor 70. In the illustrated embodiment, the difference is basically equal to thickness of the tine bar plus the diameter of the coil in the pick up tine. This is about 3 inches in this example.

Figure 6:
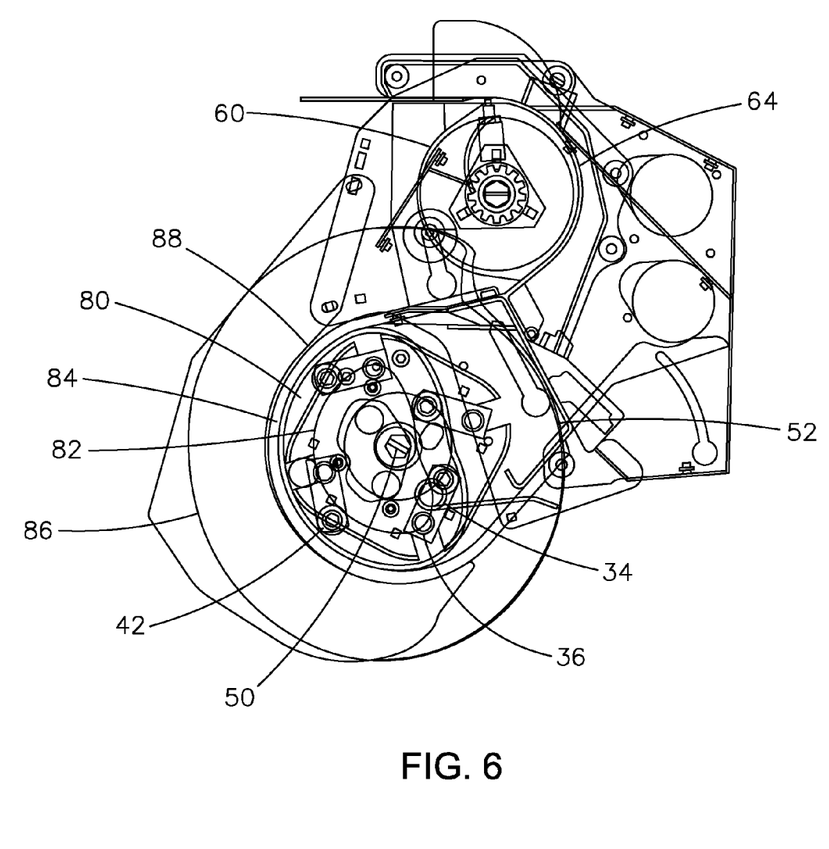
FIG. 6 shows a side cross-sectional view of an exemplary pickup assembly.

FIG. 4 shows an exemplary pickup tine bar 36 and pickup tines 32, 34 in accordance with an embodiment of the present invention. As shown in FIG. 4, the pickup tine bar 36 may include a cam follower 42 that engages a cam 44 on the pickup housing 52 (FIGS. 5 and 6). As shown, the cam follower 42 may include rectangular-shaped pieces at each end of the tine bar and a round member on the rectangular section. The round member is a bearing that follows in a corresponding track 80 (see FIGS. 5 and 6) and that dictates the orientation of the tines 32, 34 as they rotates in the pickup 30.

FIG. 6 shows details of the cam 44 and cam followers 42. As shown in FIG. 6, cam 44 may include a cam track 80 having an inner cam 82 and an outer cam 84 in which the cam followers 42 travel. The cam track 80 is designed and constructed to achieve a desired tine path 86 for the pickup tines 32, 34 to travel. As shown, the cam 44 also allows the tine bars, and hence the pickup tines 32, 34, to rotate or pivot as the cam followers 42 travel about the cam track 80. Pickup guards 88 are also provided. FIG. 6 also shows the auger 60 positioned with respect to the pickup 30 in auger housing 64.

Figure 7:
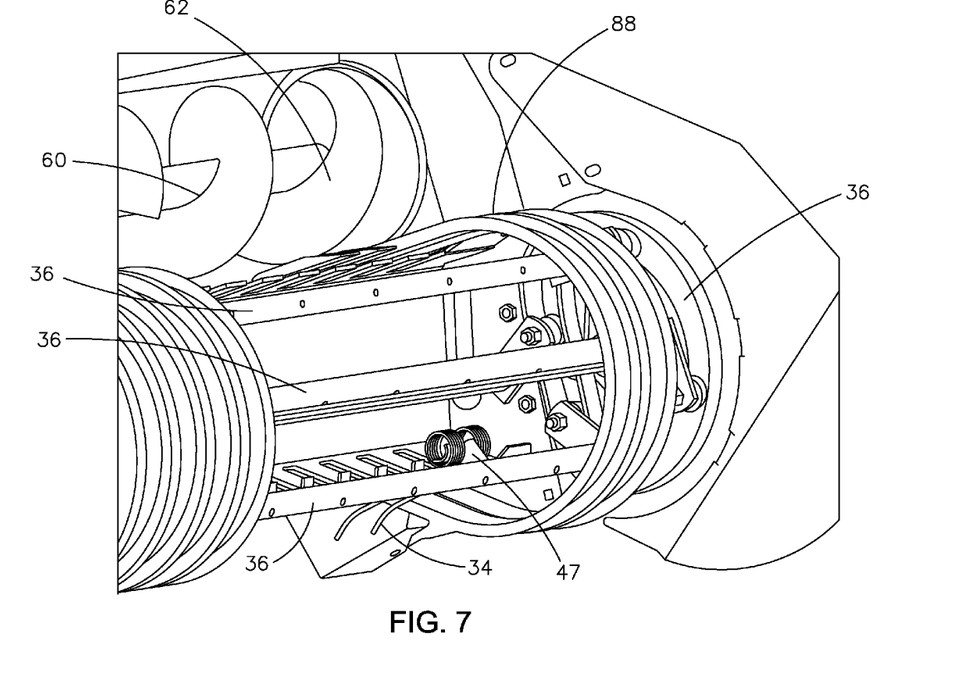
FIG. 7 shows a cut-away perspective view of an exemplary pickup in the vicinity of one of the augers.

The pickup tines 32, 34 are connected to the tine bar 36 and extend outward from the tine bar 36 as shown. Also as show, the pickup tine 32, 34 may be equally spaced from one another and around the pickup tine bar 36. The pickup tines 32, 34 may be connected to the pickup tine bar 36 using conventional techniques. For example, the tine bar 36 may include a through hole for receiving a fastener, such as a bolt (not shown). The tines 32, 34 may include a corresponding hole for receiving the bolt (not shown). In addition, a mounting bracket or tine support 47 (FIG. 7) may be provide between the tine bar and the individual tines.

As shown in FIG. 4, a lead edge 46a of the coil section 46 of the auger tines 34 may be mounted to the trailing edge 35 of the tine bar 36 and a trailing edge 46b of the coil section 46 of the pickup rotor tines 32 may be mounted to the leading edge 33 of the tine bar 36.

The illustrated pickup tines 32, 34 comprise spring coils 46, which allows the tines to twist or deflect backward to account for the tines coming up against an obstruction. The coil section 46 of the tine may comprise one or more coils (i.e., spiral turns of the tine). For example, the coil section 46 of an exemplary pickup tine 32, 34 may include two or more coils. The first or inside coil may be the only coil fixed—i.e., attached to the tine bar—and the other coil or coils would be free to rotate or move (e.g., deflect) with any loads.

As shown, the pickup tines also include an extended section 48 that extends from the coil section 46 and away from the pickup tine bar 36. As shown, the extended section 48 may include a forward bend (i.e., in the direction of travel represented by arrow 49) to facilitate picking up or gathering of the crop, and feeding of the crop to toward the augers 60 and rotor 70. Pickup tines 32, 34 having a forward bend in the extended section 48 may be referred to as curved pickup tines. The pickup tines may comprise a single, solid rod that may be formed into the desired shape, including the coil section 46 and extended section 48.

FIG. 5 is a cross-sectional view of the pickup mechanism (including pickups 30) and feeder assembly (including augers 60 and rotor 70). As shown in FIG. 5, the pickup mechanism may include a plurality (e.g., four) of tine bar 36 equally spaced radially about a pickup drive shaft 50. In one embodiment, the pickup drive shaft 50 may comprise a hex shaft that extends across the pickup and that drives the pickup reel (i.e., the plurality of tine bars 36). The pickup may comprise one solid reel and a hex shaft helps keep the whole tine bar from twisting. Appropriate bearings may also be provided.

The pickup mechanism may be housed in a pickup weld assembly or housing 52. The pickup drive shaft 50 and tine bars 36 extend transversely across the width of the housing from one side of the housing to the opposite side. An opening is provided to allow crop to enter the housing as it is picked up off the ground by the pickup tines 32, 34. In the illustrated embodiment of FIGS. 5 and 7, the pickup drive shaft 50 rotates and conveys the crop from the ground toward the auger 60 on the ends and the rotor 70 in the center.

As the crop is conveyed and transferred from the pickup auger tines 34 to the augers 60, the augers 60 function to merge the crop toward the center. The pickup 30 is wider than the rotor 70. All the crop from the pickup needs to be fed to the rotor, and the augers at each end are used to merge the crop material to the center so it can go into the rotor. The augers may include an auger flighting 62 (e.g., helix or sectional flighting) to facilitate movement of the crop toward the center.

In the center portion of the pickup, the crop is conveyed and transferred directly from the pickup rotor tines 32 to the rotor 70. The rotor 70 may also include tines or teeth 72 for receiving the crop from the pickup rotor tines 32.

In operation, the pickup 30 rotates clockwise (as viewed in FIG. 5) and both the rotor and auger tines 32, 34 on the pickup pick up the crop and convey or feed the crop to the augers 60 on the ends and in the center to a secondary feeding mechanism, which is typically a rotor 70 or stuffer. As shown in FIG. 5, the pickup rotor tines 32 mounted on the front or leading edge 33 of the tine bar 36 are in front of or leading the pickup auger tines 34 mounted on the back or trailing edge 35 of each of the individual tine bars 36. The augers 60 also rotate clockwise and merge the crop toward the center of the pickup 30. The crop is conveyed or fed to the rotor 70, which in the illustrated embodiment rotates counterclockwise. Teeth or tines 72 on the rotor 70 receive the crop and convey or feed the crop material into a bale chamber where a bale is formed. A single power source may be used to drive all the rotating components, including the pickup, the augers, and the rotor.

During operation, it is preferred that positive control of the crop is maintained to the maximum extent possible as the crop travels through the machine. The reason for this is that, typically, as soon as you have crop that isn't contacted by a member of the machine—whether it's the pick up tines, or augers, or rotors—control of that crop may be lost and once control of the crop is lost it is difficult to regain control. So when crop is handed off from one feeding mechanism to another feeding mechanism (e.g., pickup tines 34 to auger 60 at the ends, pickup tines 32 to rotor 70 in the center) it is desirable that those members be as close as possible. As such, it is desirable to have the rotor tines 32 in the center portion of the pickup 30 come into close proximity to the rotor 70 (or rotor tines 72) and also to have the auger tines 34 at the ends of the pickup come into close proximity to the augers 60. Preferably, however, the rotor tines 32 of the pickup do not contact the rotor 70 (or rotor tines 72) and the auger tines 34 of the pickup do not contact the augers 60. The offset mounting of the pickup tines in accordance with embodiments of the present invention helps minimize and/or substantially eliminate any space or dead area between the pickup rotor tines 32 and the rotor 70 (or rotor tines 72). There may be compromises with the operation and interface of other parts (e.g., having the rotor and auger tines in the right position and angle in the crop lifting position and the crop hand off position), but the idea is to minimize to the maximum extent possible the space or dead area between the pickup rotor tines and the rotor while at the same time minimizing any compromises to other areas/functions of the machinery. The offset mounting of the pickup tines in accordance with the present invention helps achieve such a result.

Figure 8:
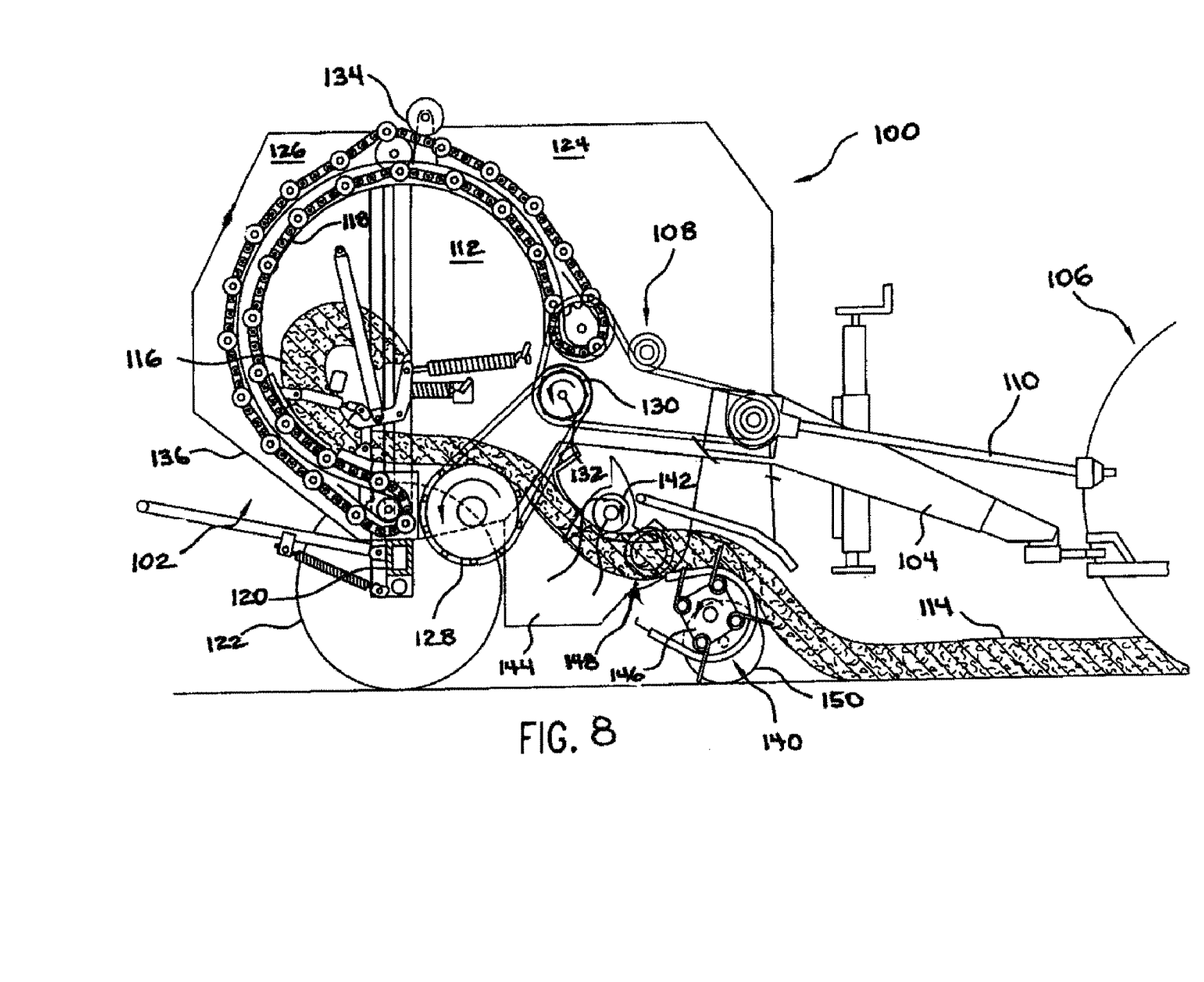
FIG. 8 is another cross-sectional view of an exemplary round baler.

The offset pickup tines of the present invention may be used with a round baler 100, such as the round baler as shown in FIG. 8. As shown, the round baler 100 has a frame 102 that also provides a housing for the baler. Frame 102 includes a tongue or hitch 104 that is connectable to a tractor 106 or other work vehicle that pulls the baler 100. Tractor 106 is operably connectable to baler 100 to provide power to drive the main drive assembly 108 of the baler 100 via a tractor power transmission assembly 110 as is conventionally known. Frame 102 supports and houses the baler main drive assembly 108.

Baler 100 typically includes a bale forming chamber 112 formed inside of frame 102. In FIG. 8, the bale forming chamber 22 is illustrated as a fixed bale forming chamber for forming a geometrical package out of cut crop material 114. The geometrical package of cut crop material formed in the bale forming chamber 112 is known as a "bale." The bale 116 is formed by a chain conveyer 118, also referred to as an "apron," that surrounds and defines a portion of the chamber 22.

Main frame 102 includes a main support beam 120 on which a pair of wheels 122 (only one shown) is rotatably affixed. Frame 102 also includes a front pair of sidewalls 124 (only one shown) coextensive with a rear pair of sidewalls 126 (only one shown) between which the bale forming chamber 112 extends. As is conventionally known, the bale forming chamber 112 is defined by sidewalls 124 and 126, apron 118, rotating floor roll 128 and rotating starter roll 130. Starter roll 130 is fixedly disposed on and attached to starter roll drive shaft 132 that is rotatably mounted to frame 102.

A pair of stub shafts 134 (only one shown) pivotally connect tailgate 136 to main frame 102. Tailgate 136 pivotally rotates about the stub shafts 134 from the closed position shown in FIG. 8 to an open position as is conventionally known so that a completed wrapped bale can be discharged to the ground for subsequent handling. Tailgate 28 includes a pair of tailgate sidewalls 126 (only one shown) that are coextensive with sidewalls 124.

Baler 100 includes a pick-up assembly 140 for picking up a cut crop material 114, such as straw, hay, and the like, from a field and delivering it to a rotatable conveying rotor 142, which feeds the cut crop material into the bale forming chamber 112 while the baler moves across a field. The pick-up assembly 140 includes a pick-up frame assembly 144 upon which are mounted a pick-up 146, a pair of augers 148 (only one shown), rotor 142 and a pick-up drive assembly. Two wheels 150 (only one shown) are rotatably mounted to pick-up frame assembly 144. Pick-up frame assembly 114 is connected to main frame 102 and pick-up drive assembly is operatively connected to receive power from the main drive assembly 108.

As is conventionally known, a bale 116 is formed within the bale forming chamber 112 when cut crop material is fed into the chamber by the pick-up assembly 140 that is powered by the pick-up drive assembly, which is powered by the main drive assembly 108, which receives power from tractor 106 via tractor power transmission assembly 110. When the bale 116 reaches a predetermined size such as occurs in fixed size chambers, or in the alternative when the bale 116 reaches a predetermined density such as occurs in variable size chambers, appropriate size or density sensors respectively indicate that the bale is ready to be wrapped. Subsequently, the baler 100 stops its forward motion while a bale wrapping operation is performed by a bale wrapping assembly (not shown), and a completed wrapped bale is ejected from the baler through the tailgate 136, which opens to permit discharge of the bale to the ground.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed:

1. A pickup crop delivery arrangement comprising:
   a rotating tine bar comprising a longitudinal length spanning a width of the pickup and having an axis of rotation parallel to the length, the tine bar having a central portion, two end portions with respect to the length, and both a leading edge and a trailing edge;
   a plurality of pickup tines comprising a plurality of elongate spaced-apart first tines connected to the trailing edge of the tine bar at both end portions, the first tines comprising a coil section and an extended portion extending outward from the tine bars and a plurality of elongate spaced-apart second tines connected to the leading edge of the tine bar at the central portion, the second tines comprising a coil section and an extended portion extending outward from the tine bars; and
   a secondary crop feed mechanism and augers;
   the first and second tines configured to feed the augers and secondary crop feed mechanism that has a plurality of crop handling projections, the secondary crop feed mechanism located laterally between the augers and mounted downstream of the augers and tine bar; and
   the second tines located forward of and aligned laterally with the secondary crop feed mechanism and the first tines are forward of and aligned laterally with the augers, the secondary feed mechanism being offset rearward of the augers.

2. The pickup crop delivery arrangement of claim 1, wherein the leading edge and the trailing edge of the tine bar are about 180 degrees apart and on opposite sides of the tine bar.

3. The pickup crop delivery arrangement of claim 1, wherein the extended portions of the plurality of second tines extend in-line along a line parallel and offset from the longitudinal axis of rotation of the tine bar and substantially parallel to one another, and wherein the extended portions of the plurality of first tines extend in-line along a line parallel and offset from the longitudinal axis of rotation of the tine bar and substantially parallel to one another, wherein the second tines lead the first tines as the tine bar rotates about its axis of rotation.

4. The pickup crop delivery arrangement of claim 1, wherein each coil section of the second tines and the first tines further comprises:
   a leading edge of the coil section; and
   a trailing edge of the coil section,
   the leading edge of the coil section of each first tine connected to the trailing edge of the tine bar, and
   the trailing edge of the coil section of each second tine connected to the leading edge of the tine bar.

5. The pickup crop delivery arrangement of claim 1, wherein the second tines and the first tines are similarly shaped.

6. The pickup crop delivery arrangement of claim 5, wherein the second tines and the first tines comprise forward curved tines, wherein the second rotor tines and the first tines when the tine bar is rotating in a first direction.

7. The pickup crop delivery arrangement of claim 1, wherein the pickup is attached to a baler and the secondary feed mechanism is configured to move crop from the pickup into a bale forming chamber of the baler.

8. A pickup mechanism for feeding a bale chamber of a baler comprising:
   at least one auger and a crop feed mechanism having a plurality of crop conveying extending members;
   a plurality of tine bars extending transversely across a pickup assembly housing located forward of the feed mechanism, each tine bar comprising
      a longitudinal length and axis of rotation, a central portion, two end portions, a leading edge, and a trailing edge;
      a plurality of pickup tines including both elongate spaced-apart sets of first and second tines;
   the plurality of elongate spaced-apart first tines connected to a trailing edge of each of the pickup tine bars at the end portions, the first tines extending outward from the tine bars;
   the plurality of elongate spaced-apart second tines connected to a leading edge of each of the pickup tine bars at the central portion, the second tines extending outward from the tine bars;
   a pickup drive shaft coupled to the pickup tine bars via a cam assembly, wherein the tine bars rotate about the pickup drive shaft and the cam assembly causes rotation of the tine bars about the tine bar axis of rotation; and
   the mounting of the first tines to the trailing edge of the tine bar and the mounting of the second tines to the leading edge of the tine bar comprises an offset mounting of the tines on each tine bar, the offset mounting of the tines allowing the second tines in the center portion to move a crop closer to the feed mechanism and further rearward than the first tines positioned forward of the at least one auger.

9. The pickup mechanism of claim 8, wherein the offset mounting of the pickup tines brings the pickup second tines in close proximity to the feed mechanism which is a rotor and the protrusions are blades, the rotor located downstream of the pickup in the crop flow to reduce a dead area between the pickup and at least one of the blades of the rotor.

10. The pickup mechanism of claim 8, wherein the first tines and the second tines comprise the same shape and structure.

11. The pickup mechanism of claim 8, wherein the first tines and the second tines further comprise a first end comprising a coil section and a second end comprising an extended section having a forward bend.

12. The pickup mechanism of claim 8, wherein a first coil of each coil section is connected to the tine bar using a fastener, and wherein the other coils of the coil section are free to move allowing the tine to rotate about an rotation axis through a center of the coil section and deflect backwards in a direction of travel of the tine.

13. The pickup mechanism of claim 8, wherein the second tines of each tine bar lead the first tines of the same tine bar as the tine bar rotates about the pickup drive shaft due to the mounting position of the second tines on the leading edge of the tine bar and the first tines on the trailing edge of the tine bar.

14. The pickup mechanism of claim 8, further comprising a pickup position and a transfer position, wherein in the transfer position:
   the pickup first tines are in close proximity to the augers positioned downstream of the pickup mechanism in a feeder assembly, and
   the pickup second tines are in close proximity to tines of the feed mechanism positioned downstream of the pickup mechanism in the feeder assembly,
   wherein the positioning of the pickup second tines on the leading edge of the tine bar reduces any dead area between the pickup second tines and the plurality of crop conveying extending members of the feed mechanism.

15. A pickup mechanism for use with a feeder assembly of a baler or crop harvester, the pick-up mechanism comprising:
   a pickup assembly having a feed opening;
   a plurality of tine bars extending transversely across the pickup assembly, each tine bar comprising a longitudinal length and axis of rotation, a central portion, two end portions, a leading edge, and a trailing edge;
   an off-set mounting of the pickup tines to the tine bar, the offset mounting comprising:
      a plurality of elongate spaced-apart auger tines connected to a trailing edge of each of the pickup tine bars at the end portions, the auger tines extending outward from the tine bars;
      a plurality of elongate spaced-apart rotor tines connected to a leading edge of each of the pickup tine bars at the central portion, the rotor tines extending outward from the tine bars;
   a rotor positioned downstream to the pickup tine bars, said rotor spaced apart from said pickup tine bar and defining a space therebetween;
   a pickup drive shaft operatively coupled to the pickup tine bars via a support with a bearing, wherein the tine bars are driven by and rotate about the pickup drive shaft and cam followers at the end of each tine bar engage a cam track mounted on the pickup assembly thereby causing the tine bars to rotate in the bearings on the support about the tine bar axis of rotation; and
   a transfer position wherein the pickup rotor tines of one of the tine bars are in close proximity to the rotor in the center of the pickup assembly and the pickup auger tines of the same tine bar are in close proximity to augers at the ends of the pickup assembly.

16. The pickup mechanism of claim 15, further comprising a reduced dead area between the pickup and blades extending from the rotor resulting from the offset mounting of the pickup tines.

17. A method of constructing a pickup of an agricultural baler having an offset tine arrangement, the method comprising:
   providing a tine bar comprising a longitudinal length, a central portion, two end portions, a leading edge, and a trailing edge that is opposite the leading edge on the tine bar, the tine bar having an axis of rotation parallel to the longitudinal length;
   connecting a plurality of elongate spaced-apart first tines to the trailing edge of the tine bar in the end portions;
   offsetting the pickup tines by connecting a plurality of elongate spaced-apart second tines to the leading edge of the tine bar in the central portion; and
   the second tines are located forward of and aligned laterally with a secondary crop feed mechanism of the baler and the first tines are forward of and aligned laterally with augers, the secondary crop feed mechanism being offset rearward of at least one of the augers.

* * * * *